/n(12) United States Patent
Ekladyous et al.

(10) Patent No.: US 8,422,004 B1
(45) Date of Patent: Apr. 16, 2013

(54) AUTOMOTIVE HEADLAMP AIMING INSENSITIVE TO INTENSITY VARIATIONS

(75) Inventors: Albert Ekladyous, Shelby Township, MI (US); John W. Wilds, Trenton, MI (US); Arun Kumar, Farmington Hills, MI (US); Venkatesan Balaraman, Troy, MI (US); Sleiman N. Abdelnour, Macomb, MI (US); Mahendra S. Dassanayake, Bloomfield Hills, MI (US); Candace C. Glasgow, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/314,226

(22) Filed: Dec. 8, 2011

(51) Int. Cl.
*G01J 1/00* (2006.01)

(52) U.S. Cl.
USPC .......................................... 356/121; 356/127

(58) Field of Classification Search .................. 356/212, 356/121–127; 362/510, 278, 544, 543, 538, 362/61; 340/468, 457.2; 33/288, 203
See application file for complete search history.

(56) References Cited

U.S. PATENT DOCUMENTS

| | | | |
|---|---|---|---|
| 3,746,449 A | 7/1973 | Schick | |
| 4,634,275 A | 1/1987 | Yoshida et al. | |
| 4,948,249 A | 8/1990 | Hopkins et al. | |
| 2,078,490 A | 1/1992 | Oldweiler et al. | |
| 5,321,439 A | 6/1994 | Rogers | |
| 5,331,393 A * | 7/1994 | Hopkins et al. | 356/121 |
| 5,373,357 A | 12/1994 | Hopkins et al. | |
| 5,426,500 A * | 6/1995 | Ohana | 356/218 |
| 5,681,104 A * | 10/1997 | Chinniah et al. | 362/538 |
| 5,796,473 A * | 8/1998 | Murata et al. | 356/121 |
| 5,828,298 A * | 10/1998 | Eagan | 340/458 |
| 5,829,870 A * | 11/1998 | Remillard et al. | 362/510 |
| 5,877,680 A * | 3/1999 | Okuchi et al. | 340/468 |
| 7,201,506 B2 * | 4/2007 | Ishida et al. | 362/544 |
| 7,313,870 B2 * | 1/2008 | Jeon | 33/288 |
| 7,710,555 B2 * | 5/2010 | Hoenke et al. | 356/155 |

(Continued)

FOREIGN PATENT DOCUMENTS

JP 2005189145 A 7/2005

OTHER PUBLICATIONS

Alessandro Bevilacqua, et al, An Automatic System for the Real-Time Characterization of Vehicle Headlamp Beams Exploiting Image Analysis, IEEE Transactions on Instrumentation and Measurement, vol. 59, No. 10, Oct. 2010 pp. 2630-2638.

(Continued)

*Primary Examiner* — Sang Nguyen
(74) *Attorney, Agent, or Firm* — Raymond Coppiellie; MacMillan, Sobanski & Todd, LLC

(57) ABSTRACT

A headlamp aiming system is provided for aiming a headlamp of a vehicle. An aimer includes a CCD camera for receiving illumination produced by the headlamp to produce a beam pattern image. A controller receives the beam pattern image from the aimer to determine an aiming correction to move the detected beam pattern to a predetermined position. An adjuster is operatively coupled to the vehicle for executing adjustments of the headlamp in response to the aiming correction. The CCD camera captures an initial image using an initial exposure time, measures a light accumulation value corresponding to the initial image, determines a final exposure time in response to the measured light accumulation value and a predetermined light accumulation value, and captures the beam pattern image using the final exposure time.

2 Claims, 5 Drawing Sheets

U.S. PATENT DOCUMENTS 8,314,558 B2 * 11/2012 Dassanayake et al. ......... 315/82
2006/0256320 A1    11/2006 Peterson
2011/0169410 A1 *  7/2011 Dassanayake et al. ......... 315/82

OTHER PUBLICATIONS

Hopkins Manufacturing Corporation, Hoppy®, B4A Instruction Manual, pp. 1-22.

Hopkins Manufacturing Corporation, Hoppy®, Vision 1 Instruction Manual, 310-0288-135, 1993, pp. 1-47.

Hopkins Manufacturing Corporation, American Aimers Vision 100, Optical Headlamp Aimer Instruction Manual, Wall Industries, LLC, 310-0712-006 Rev. Aug. 2006, pp. 1-20, 1999.

* cited by examiner

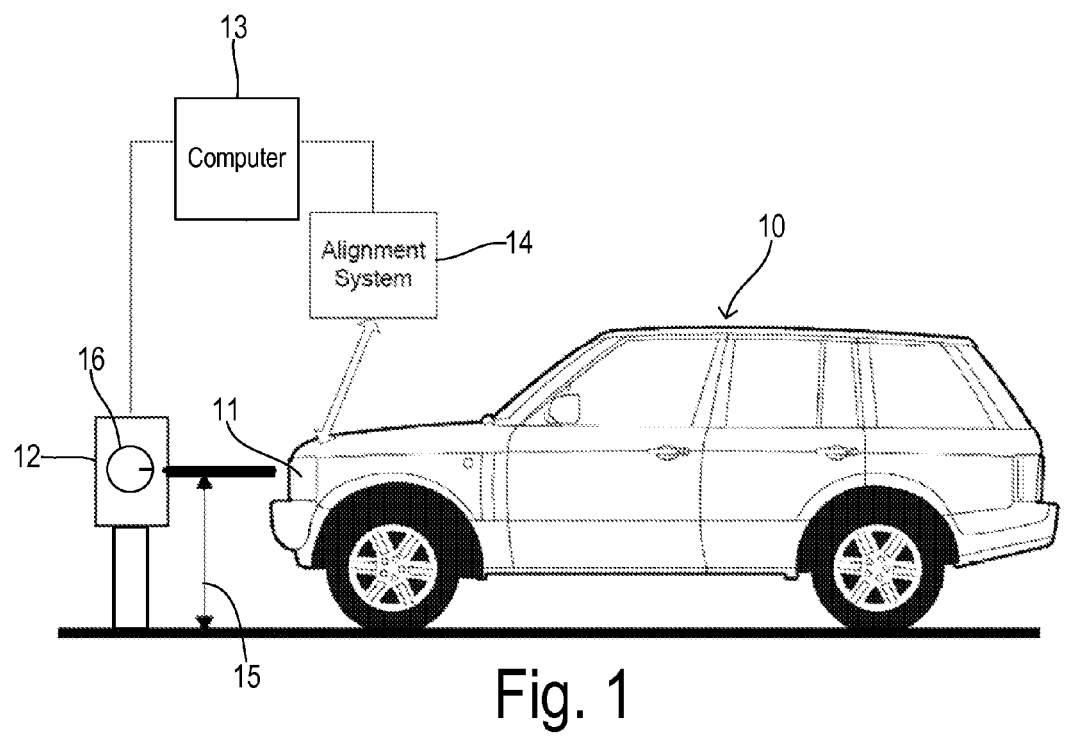
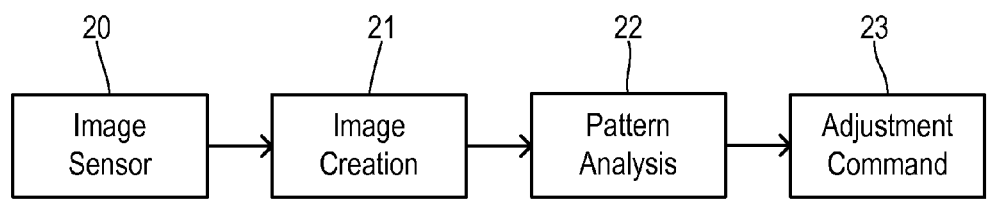

AUTOMOTIVE HEADLAMP AIMING INSENSITIVE TO INTENSITY VARIATIONS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to motor vehicle headlamp systems, and, more specifically, to method and apparatus for aiming headlamps.

Motor vehicles use headlamps to illuminate the road. One or two pairs of headlamps are typically mounted at the left and right front sides of the vehicle. For example, a pair of low-beam headlamps and a pair of high-beam headlamps are used on some vehicles. Other vehicles may employ a single pair of headlamps that are electrically controlled to provide either low-beam or high-beam illumination.

Various regulations specify the light patterns that are to be produced by the headlamps. In particular, a beam cutoff (i.e., an upper border between illumination falling above and below a particular intensity) must be located at a certain height above the ground at a specified distance in front of the vehicle. In order to ensure compliance with regulations, headlamp mountings are made adjustable in order to aim the light beams as required. In general, a vehicle under test is put in a certain position relative to a test surface or measuring device, the headlamps are illuminated, and the resulting light pattern is analyzed. Based on the analysis, the headlamp mounting is adjusted either manually or automatically to reduce any error detected between the actual location of the beam and a desired beam location so that the desired cutoff is obtained. Headlamp aiming equipment (i.e., aimers) is available from many manufacturers which employ either projection analysis or direct measurement of the beam cutoff. Robotic mechanisms are also widely available for performing automatic adjustments.

It is well known that the actual intensity of light output from a headlamp is not perfectly constant. The intensity, and thus the precise beam pattern as detected by the aimer, varies in response to many different conditions that cannot be controlled or eliminated such as bulb-to-bulb differences, voltage fluctuations within the vehicle, engine on versus engine off voltages, obstructions in the light path, the presence of ambient lighting, variations in bulb mounting, and others. It is conventionally believed that the real-world aiming of the headlamp beam is relatively insensitive to these variations, and that the location of the horizontal cutoff would remain substantially constant. Nevertheless, headlamp aiming errors and inconsistencies have continued to be a common problem for vehicle manufacturers using the aimers that have been commercially available.

SUMMARY OF THE INVENTION

It has been discovered that even though intensity variations do not significantly affect the beam cutoff, they do affect detection of the beam pattern in conventional aimers. Specifically, previous systems have employed a constant exposure setting for the CCD camera which is used to detect an image of the beam pattern. As the intensity from any particular headlamp changes, however, the detected shape of the beam pattern also changes because the shape depends on the size of intensity bands detected by the camera. The variation in detected beam pattern leads to differences in the resulting aim. By using auto exposure to correspondingly vary the exposure time, the present invention desensitizes the headlamp aim to the intensity variations.

In one aspect of the invention, a headlamp aiming system is provided for aiming a headlamp of a vehicle. An aimer includes a CCD camera for receiving illumination produced by the headlamp to produce a beam pattern image. A controller receives the beam pattern image from the aimer to determine an aiming correction to move the detected beam pattern to a predetermined position. An adjuster is operatively coupled to the vehicle for executing adjustments of the headlamp in response to the aiming correction. The CCD camera captures an initial image using an initial exposure time, measures a light accumulation value corresponding to the initial image, determines a final exposure time in response to the measured light accumulation value and a predetermined light accumulation value, and captures the beam pattern image using the final exposure time. As a result, aiming variations that had resulted from uncontrollable intensity variations from the headlamp are avoided.

BRIEF DESCRIPTION OF THE DRAWINGS

FIG. 1 shows a vehicle and headlamp aiming system.
FIG. 3 is a functional block diagram of an aiming system.

DETAILED DESCRIPTION OF PREFERRED EMBODIMENTS

Figure 2:
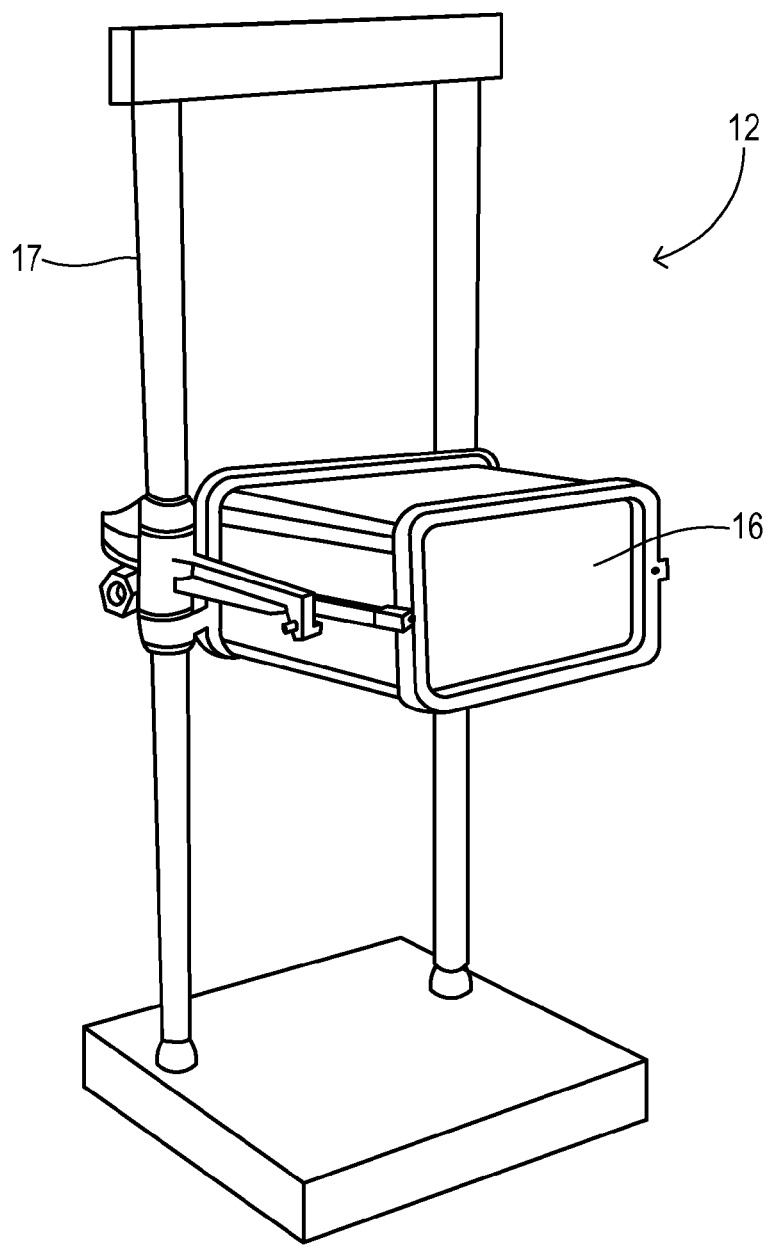
FIG. 2 is a perspective view of a headlamp aimer.

Referring to FIG. 1, a vehicle 10 has a headlamp 11 that projects a light beam into an aimer 12. Aimer 12 is connected to a computer 13, which in turn controls an alignment system 14 mechanically coupled to headlamp 11 for adjusting a cutoff height 15 of the light beam. Aimer 12 accepts a headlight beam as an input to an optical system 16 for measuring cutoff height 15. A commercially available aimer can be used such as the Hoppy® Vision 100 optical headlamp aimer available from Wall Industries, LLC, of Emporia, Kans., or similar headlamp aiming systems available from Fori Automation Inc., of Shelby Township, Mich., and others.

FIG. 2 shows aimer 12 in greater detail. Optics 16 is adjustably supported on a stand 17 so that it may be aligned to directly receive a headlamp beam. Alternatively, other arrangements may also be used wherein a headlamp beam is projected onto a screen and the aimer senses the beam pattern and location by taking an image of the screen.

As shown in FIG. 3, the aiming process begins with an image of the beam pattern taken by an image sensor 20. Detected light from image sensor 20 is used to create a beam pattern image in an image creation block 21. A pattern analysis block 22 analyzes the image to measure the beam pattern and to determine an aiming correction to alleviate any discrepancy between the detected beam pattern and a desired beam pattern (i.e., the optimal location of a center of the beam pattern and/or an upper horizontal cutoff height). The adjustment command is processed in a block 23 which may be used to command an automatic adjuster.

Figure 4:
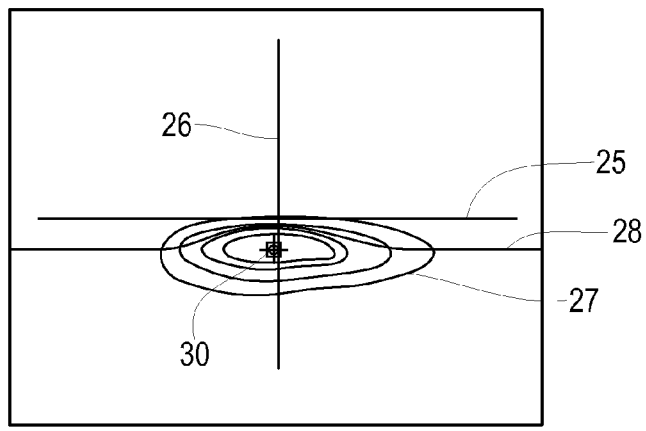
FIGS. 4-6 illustrate different beam patterns detected by a fixed exposure CCD camera for different intensities produced by a particular headlamp.

The optics in an aimer system may be typically comprised of a CCD imaging camera. A sample image formed by an aimer is shown in FIG. 4 in relation with a desired horizontal cutoff 25 and a vertical center adjustment axis 26. A beam pattern image 27 corresponds to a light output of the headlamp being at a low intensity, such as during times when a relatively low headlamp voltage of 11.3 volts is present. A beam-pattern upper edge 28 and a beam center 30 as determined by conventional pattern analysis of respective intensity bands in the beam pattern are shown.

Figure 5:
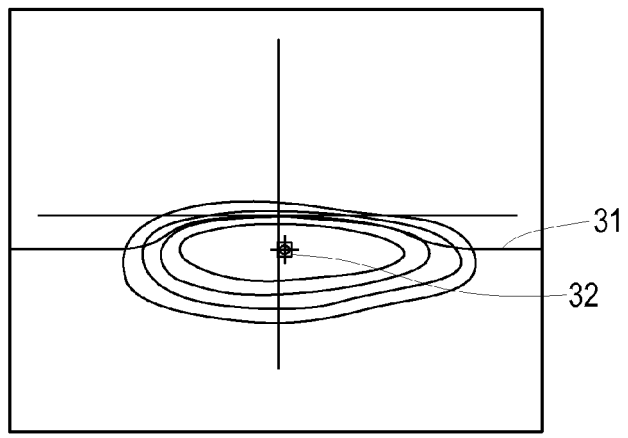

FIG. 5 shows a similar image corresponding with a nominal headlamp intensity produced at a nominal headlamp voltage of 12.8 volts. An upper edge 31 of the detected beam pattern and a center 32 are shown to have moved with respect to the positions determined by pattern analysis for the image of FIG. 4.

Figure 6:
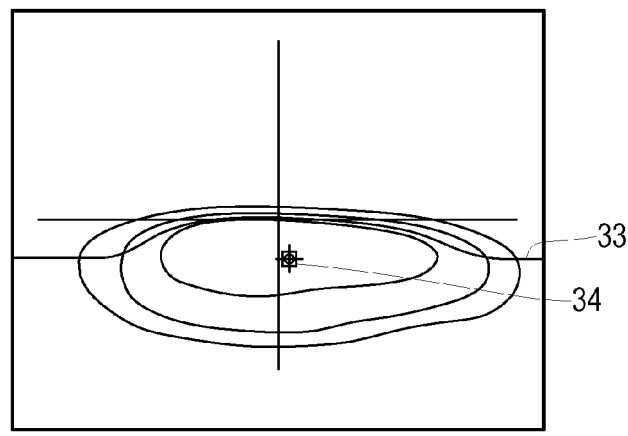

FIG. 6 shows an upper edge 32 and a center 34 of a beam pattern produced with a high intensity resulting from a high headlamp voltage of 14 volts. Since the upper cutoff and center of the beam pattern are detected at different locations for the same headlamp at different intensities, the resulting aim is affected by the actual intensity at time of aiming. In other words, the discrepancy that will be measured between the actual beam location and the desired beam location changes along with the instantaneous intensity being produced by the headlamp being aimed.

Figure 7:
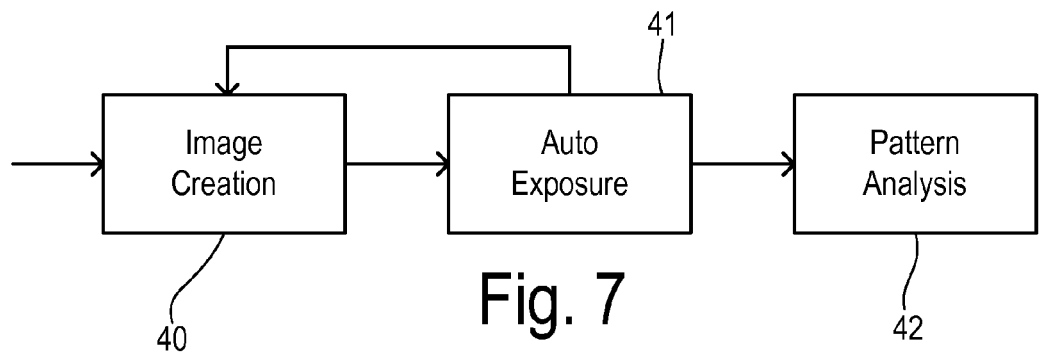
FIG. 7 is a functional block diagram showing one embodiment of the invention.

By adopting auto exposure, the pattern analysis portion of the aimer sees substantially the same beam pattern regardless of any variations in lamp intensity. As shown in FIG. 7, the creation of a beam pattern image is modified by the present invention to include auto exposure. In an auto-exposure process, image creation 40 provides a detected image to auto exposure block 41. In block 41, a light accumulation value (i.e., a quantification of the total light received integrated across an entire image or, alternatively, a region of interest within the image) is characterized for an initial captured image. The light accumulation value is compared to an optimal value that is determined in advance. Based on discrepancies between the light accumulation value measured for the initial image than the optimal value, an optimal exposure time is determined that would result in a predetermined desired light accumulation value. Using the optimal exposure time, a final image is captured and used by pattern analysis 42. The optimization of the exposure time may include progressive steps to adjust the exposure time based on multiple intermediate images, as known in the art. The final image is based on a final exposure time that provides a predetermined exposure regardless of the variable light intensity of the headlamp.

The optimal value for the light accumulation can be empirically determined for any particular vehicle/headlamp design by finding an exposure time that produces the best image under controlled ideal conditions using an imager with the same properties as the imager that would be used on the production line, for example. Thus, the optimal light accumulation value would be different for each model of vehicle and/or type of headlamp. If a change is made in the design, materials, or electrical specifications of a headlamp during a production run of a particular model of vehicle, it may become necessary to re-determine the optimal light accumulation value to be used.

Figure 8:
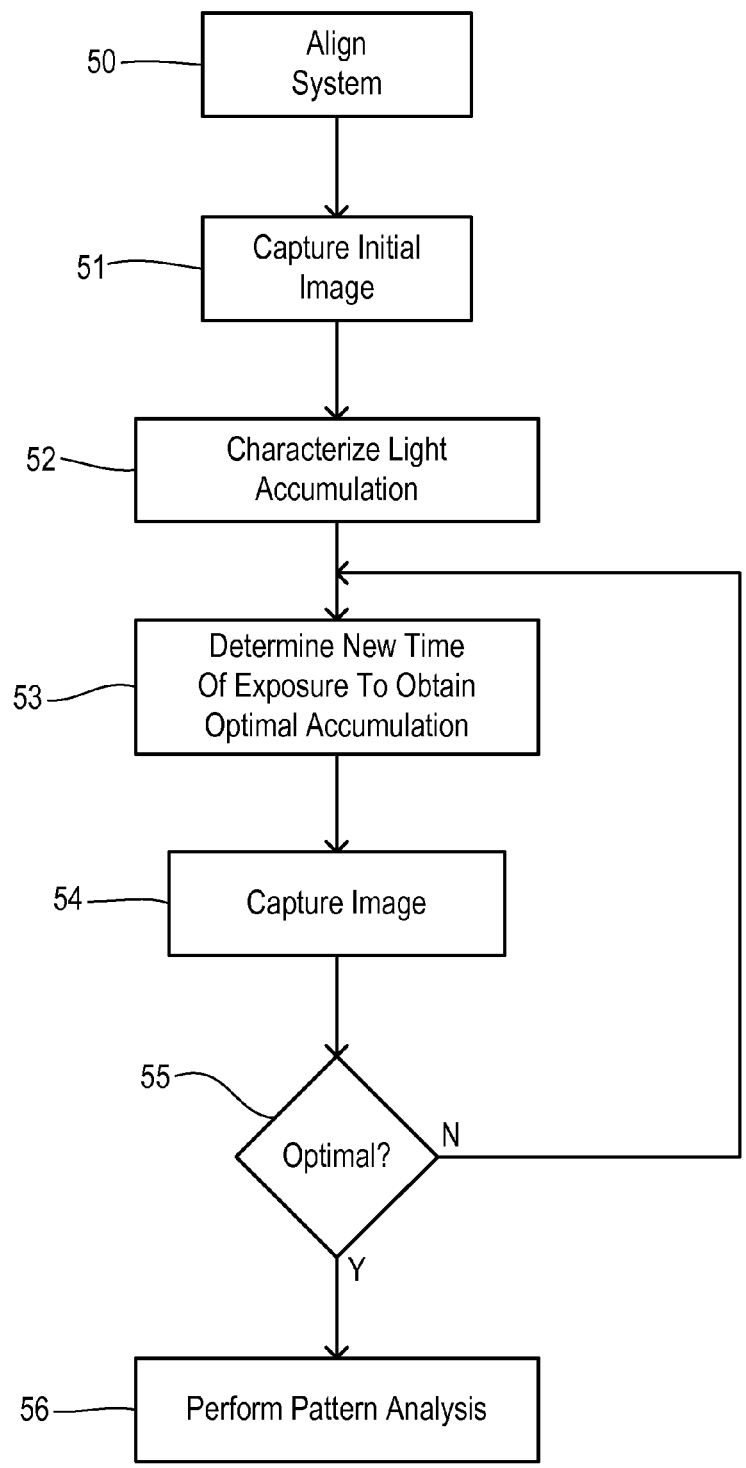
FIG. 8 is a flowchart showing one preferred method of the present invention.

A method of the invention is shown in greater detail in FIG. 8. An aiming system is aligned with a headlamp in step 50. In step 51, an initial image is captured. The light accumulation of the initial image is characterized in step 52. Based on any difference between the measured light accumulation value and an optimal accumulation value, a new exposure time is determined in step 53. The optimal accumulation value is preferably determined with respect to a particular vehicle/headlamp combination as explained above. With the new exposure time, another image is captured in step 54. The image captured in step 54 may be a final image if a sufficiently accurate estimate of the final exposure time can be made based on just one initial image. However, successive approximation may be desirable to ensure that the desired exposure has been accurately obtained since some inaccuracies may exist in known algorithms for estimating the relationship between light accumulation and exposure times. Therefore, a check may be made in step 55 to determine whether the exposure of the image captured in step 54 is optimal (e.g., within a predetermined range of the desired exposure). If not, then a return is made to step 53 to obtain a closer approximation of the proper exposure time using the most recently captured image. Once an optimal image has been obtained, then conventional pattern analysis is performed in step 56.

Figure 9:
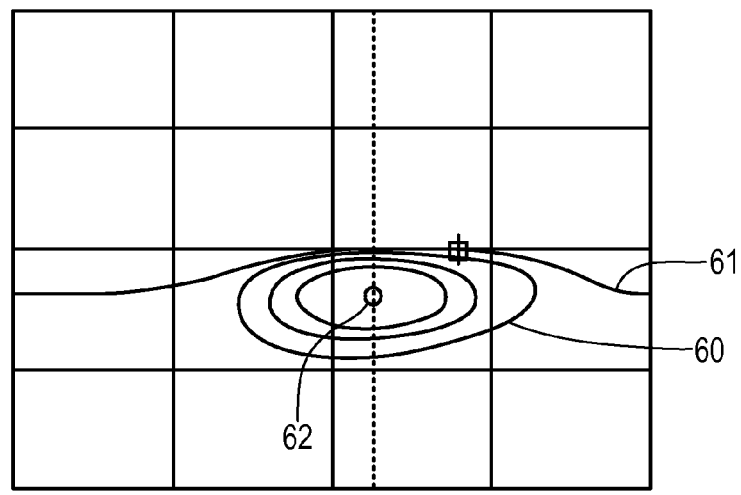
FIG. 9 illustrates a resulting beam pattern over a variety of headlamp intensities when using auto exposure.

FIG. 9 shows an image captured using auto exposure having a beam pattern 60 with an upper edge 61, wherein the image looks the same regardless of the particular intensity when the image is captured. The center of beam pattern 62 and upper edge 61 can be reliably detected at substantially the same location regardless of the intensity variations. Therefore, consistent aiming is performed and aiming variations are reduced.

Most conventional aimers have been based on CCD imagers. Fixed exposure times have been used due to an incorrect assumption that light intensity variations did not affect aiming. The present invention has recognized the impact of intensity variations on the resulting aim. Many CCD imagers conventionally employed in aimers have been of a mass-produced type which have had hardware capable of implementing auto exposure even though that feature has not previously been used by an aimer. Thus, the present invention may be implemented on some conventional aiming systems by making appropriate changes to the firmware and/or software for creating the image.

As shown by the foregoing description, the present invention can use standard auto exposure algorithms commonly implemented in CCD cameras to compensate for varying beam pattern intensity and still retain the beam pattern shape which is critical for aiming. With auto exposure, the beam pattern shape is retained under a variety of different intensity conditions. Capturing the beam pattern shape with auto exposure better represents the physical world as the beam pattern shape does not change with beam pattern intensity. By normalizing the shape of the beam pattern, headlamp aiming is desensitized to intensity variations that can come from a variety of sources.

What is claimed is:

1. A headlamp aiming system for aiming a headlamp of a vehicle, comprising:
    an aimer including a CCD camera for receiving illumination produced by the headlamp to produce a beam pattern image;
    a controller for receiving the beam pattern image from the aimer to determine an aiming correction to move the detected beam pattern to a predetermined position; and
    an adjuster for operatively coupling to the vehicle for executing adjustments of the headlamp in response to the aiming correction;

wherein the CCD camera captures an initial image using an initial exposure time, measures a light accumulation value corresponding to the initial image, determines a final exposure time in response to the measured light accumulation value and a predetermined light accumulation value, and captures the beam pattern image using the final exposure time.

2. A method of aiming an automotive headlamp comprising the steps of:

aligning a CCD image sensor to receive light emitted by the headlamp;

capturing an initial image with the CCD image sensor using an initial exposure time;

a controller measuring a light accumulation value corresponding to the initial image;

the controller determining a final exposure time in response to the measured light accumulation value and a predetermined light accumulation value;

capturing a final image with the CCD image sensor using the final exposure time; and the controller analyzing the final image to detect a beam pattern in the final image and to determine an aiming correction to move the detected beam pattern to a predetermined position.

* * * * *